(No Model.)  2 Sheets—Sheet 1.

M. JENSEN.
CAN SOLDERING MACHINE.

No. 516,308.  Patented Mar. 13, 1894.

Witnesses,  Inventor
　　　　　　Mathias Jensen
　　　　　By Dewey & Co.
　　　　　　Attys (No Model.)  2 Sheets—Sheet 2.

M. JENSEN.
CAN SOLDERING MACHINE.

No. 516,308. Patented Mar. 13, 1894.

Witnesses,

Inventor,
Mathias Jensen
By Dewey & Co.
Attys

UNITED STATES PATENT OFFICE.

MATHIAS JENSEN, OF ASTORIA, OREGON, ASSIGNOR OF ONE-HALF TO THE JENSEN CAN FILLING MACHINE COMPANY, OF SAME PLACE.

CAN-SOLDERING MACHINE.

SPECIFICATION forming part of Letters Patent No. 516,308, dated March 13, 1894.

Application filed August 9, 1893. Serial No. 482,744. (No model.)

*To all whom it may concern:*

Be it known that I, MATHIAS JENSEN, a citizen of the United States, residing at Astoria, Clatsop county, State of Oregon, have invented an Improvement in Can-Soldering Machines; and I hereby declare the following to be a full, clear, and exact description of the same.

My invention relates to devices for soldering the longitudinal seams of cans.

It consists in certain details of construction which will be more fully explained by reference to the accompanying drawings, in which—

Figure 1:
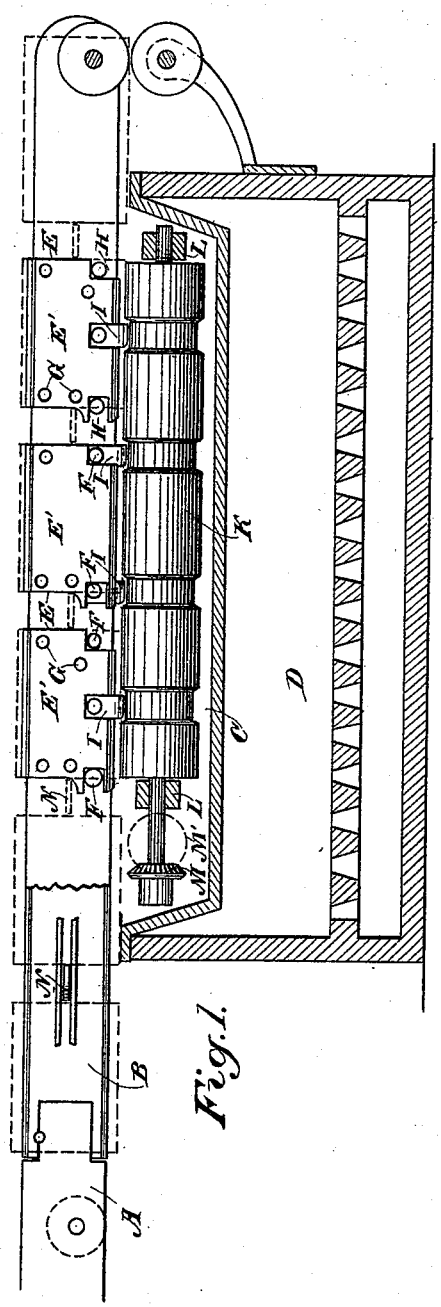
Figure 2:
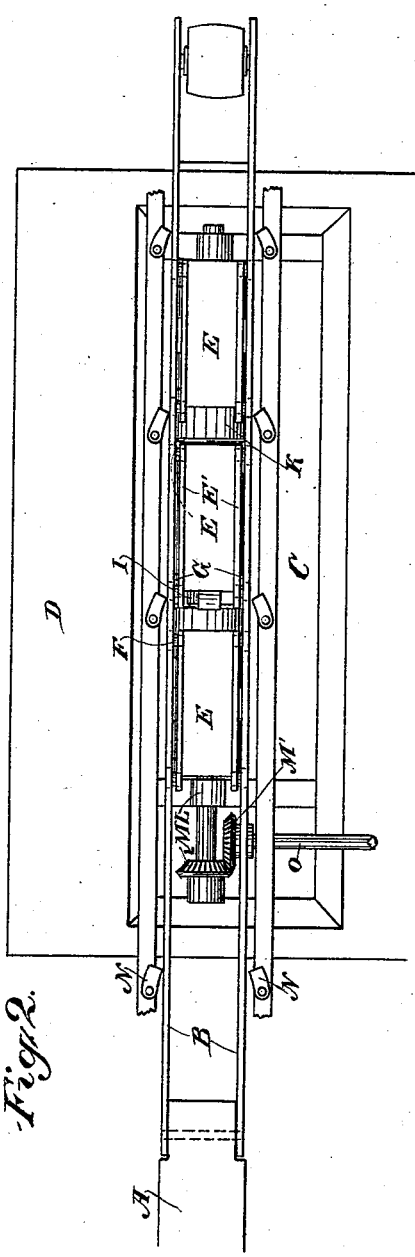
Figure 3:
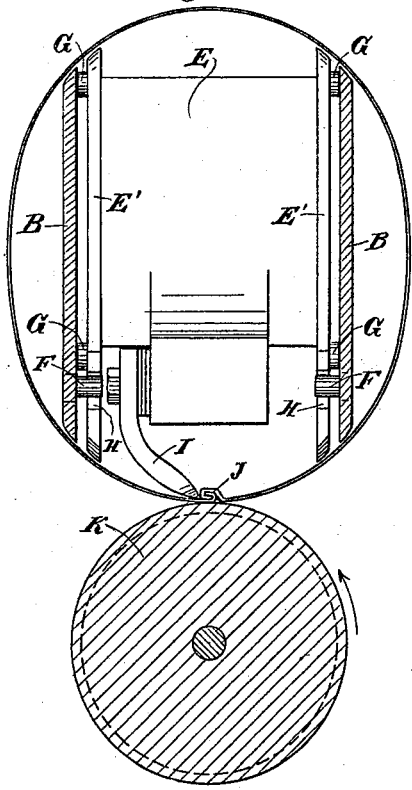
Figure 4:
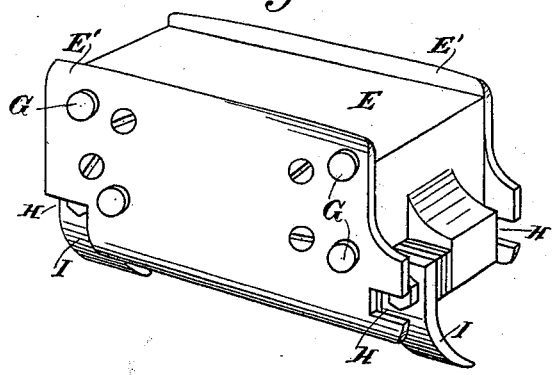

Figure 1 is a longitudinal vertical section taken through the solder tank and furnace, showing my device. Fig. 2 is a plan view of the same. Fig. 3 is a transverse section showing the interior guide and the can body surrounding it in position for solder. Fig. 4 is a perspective view of one of the interior blocks.

The object of my invention is to provide a novel means for applying the solder to the longitudinal seams of can bodies and other tubular devices having seams which it is desirable to solder.

My present invention is an improvement upon Letters Patent No. 442,484, dated December 9, 1890, issued to myself and company, and it relates especially to that portion of the apparatus by which the soldering of the seams is effected. The other parts of the machine having no especial bearing upon this particular device, I have here shown only so much of the apparatus as will illustrate the soldering trough, the mechanism for supporting and guiding the cans, and for applying the solder to the seams as they pass.

A is the horn from which the can body is delivered upon the track B, and it is pushed forward with intermittent movement by the action of reciprocating pawls N which are adapted to engage with opposite sides of the can body in a manner similar to that described in my former Letters Patent. The tracks B consist of two parallel plates standing on edge vertically and they extend above the solder trough C which is kept hot by means of the furnace D in any usual or desired manner. The tracks B stand vertically and parallel with each other, and have pins F at intervals which are adapted to support blocks E. These blocks are composed of a central solid piece of metal having side plates E' bolted to them and forming a part of them. The upper and lower edges of the plates E' are beveled or chamfered off, as shown, so that when a can body surrounds them, these edges will approximately fit the interior curvature of the can body. These blocks or guide carriers E E' fit between the vertical tracks B, and are kept out of actual contact by small projecting studs G at top and bottom, and at each end of the blocks, so that any dirt or deposit of any kind which may fall between the side plates E' and the track plates B, will fall through and will not cause the blocks to become fixed in their places. These blocks and side plates have slots or cut away portions at each end, as shown at H, to allow them to fit and be supported upon the pins F which extend inwardly from the parallel side plates E'.

To each of the blocks E and within the side plates E' is fixed a guide spur or spurs I. These spurs are suitably secured by bolts or otherwise and the points extending downwardly below the lower edges of the side plates E' are in position to abut against the double folded seam J of the can body which extends along the lowermost side of the can body and inside thereof in the position in which it was formed upon the machine, and in which it is desirable for it to pass over the solder tank.

Beneath the blocks E and within the solder tank, is journaled the roller K which extends longitudinally through the solder tank and parallel with the tracks B, beneath which, and the blocks E, it lies as shown. The ends of this roller are journaled in suitable bearings or boxes L, and it is rotated by any suitable or desired arrangement of mechanism. In the present case I have shown the beveled gear M fixed upon the shaft of the roller, and this is engaged by a beveled gear M' upon the transversely journaled shaft O. When the roller K is rotated within the solder tank, the contents of the latter being in a melted condition, the solder will be constantly carried up by the roller and deposited upon the outside of the seam J of the can, and the seam is kept in position and the can prevented from rotating while passing above the roller, by means of the guide spurs previously described. The solder is constantly carried up by the roller and forced against the exterior of the seam J as the can is moved along by intermittent strokes, and the solder is thoroughly sweated into the seam before the can has passed beyond the action of this roller, the seam being thus thoroughly and perfectly soldered from the outside without any need of applying solder to its interior. In the present case I have shown the roller made with alternate large and small sections, and the blocks E are so arranged with relation to these sections that the projecting spurs I will stand above the smallest diameter of the roller. As shown in the present case each alternate block E has a single central spur and the next adjacent blocks have spurs at the opposite ends, the blocks being of such length that these spurs just coincide with the smaller diameters of the roller. The ends of the spurs which are presented toward the approaching can are slightly curved upward as shown so as to pass readily into the can as it arrives, and as the spurs extend a little way down into the grooves or smaller channels of the rollers, the blocks E will be slightly lifted, when the can passes along so as to surround them. This lifts the upper part of the can out of contact with the upper edges of the side track plates B, and the seam is thus by the weight of the blocks, kept in close contact with the guiding spurs I which in turn hold it in contact with the larger part of the roller, so that the solder is constantly applied to the seam while the can is passing.

The manner in which the guide blocks E are supported upon the pins F of the tracks B allows the blocks to be thus lifted as the can passes, and as the weight of the blocks is always acting upon each can as it passes, the seam of the latter will be subjected to the same pressure to keep it in contact with the roller, and the soldering will not be affected by any expansion or warping of the track B or the roller K.

It will be manifest that this device may also be used for soldering the side seams of square or polygonal cans, and seams which are not locked, suitable mechanism being employed in any case to retain the cans in position so that the seams will always be in contact with the solder roller.

Having thus described my invention, what I claim as new, and desire to secure by Letters Patent, is—

1. A device for soldering the longitudinal seams of metallic cans consisting of a rotating roller journaled parallel with and below the axis of the can and dipping into molten solder, said roller operating in a direction transversely of the length of the seam and a means for supporting the can in contact with the roller, whereby a portion of the solder is constantly carried upward by the roller and deposited upon the seam, substantially as herein described.

2. A device for soldering the longitudinal seams of cans, consisting of a roller extending lengthwise of the can and rotating in a direction at right angles thereto, said roller being journaled parallel with and below the cans to be soldered having its lower portion dipping into molten solder, means whereby the roller is rotated, and means whereby the cans are advanced with the seam to be soldered in contact with the top of the roller, substantially as herein described.

3. A device for soldering can bodies consisting of a rotating roller dipping into molten solder, guides upon which the can bodies are advanced above and parallel with the roller, and a means forming contact with the interior projecting portion of the seam for retaining the seam of the can in contact with the top of the roller whereby the solder is constantly applied to the seam, substantially as herein described.

4. A device for soldering the seams of can bodies, consisting of a roller rotating with its lower part in a bath of molten solder, tracks upon which the can bodies are conveyed above the roller with their axes approximately parallel thereto and the seam to be soldered in contact with the roller, blocks movably supported between the tracks and having guide arms or spurs adapted to form contact with the interior projecting portion of the seam, whereby the latter is constantly retained in contact with the roller and the can prevented from being turned by the movement of the roller, substantially as herein described.

5. In a soldering machine, a rotating roller dipping in melted solder and adapted to constantly raise the latter by its rotation, guide tracks consisting of parallel plates standing on edge and extending above and parallel with the roller, upon which tracks the can bodies are advanced with the seam to be soldered in contact with the roller, and guides between said tracks and operating against the inner portion of the seam by which the can is prevented from turning and the seam retained in contact with the roller, substantially as herein described.

In witness whereof I have hereunto set my hand.

MATHIAS JENSEN.

Witnesses:
S. H. NOURSE,
J. A. BAYLESS.